United States Patent [19]
Lee et al.

[11] Patent Number: 5,972,232
[45] Date of Patent: Oct. 26, 1999

[54] MICROMIRROR FOR A HYBRID OPTOELECTRONIC INTEGRATED CIRCUIT, A METHOD FOR MANUFACTURING THE SAME, A MICROMIRROR-PHOTODETECTOR ASSEMBLY AND AN ASSEMBLY OF HYBRID OPTOELECTRONIC INTEGRATED CIRCUIT FOR RECEIVING LIGHT

[75] Inventors: Sang Hwan Lee; Nam Hwang; Min Kyu Song; Hee Tae Lee; Kwang Eui Pyun, all of Daejeon, Rep. of Korea

[73] Assignees: Electronics and Telecommunications Research Institute, Daejeon; Korea Telecom, Seoul, both of Rep. of Korea

[21] Appl. No.: 08/984,148

[22] Filed: Dec. 3, 1997

[30] Foreign Application Priority Data

Dec. 11, 1996 [KR] Rep. of Korea ................ 96-64195

[51] Int. Cl.$^6$ .................................................. H01L 21/00
[52] U.S. Cl. ................................ 216/24; 216/2; 438/69; 438/735; 385/14
[58] Field of Search ........................... 216/2, 24, 26, 216/52; 438/57, 65, 69, 719, 733, 735, 753; 385/4, 12, 14

[56] References Cited

U.S. PATENT DOCUMENTS 4,735,677 4/1988 Kawachi et al. .................. 216/24 X

OTHER PUBLICATIONS

Sam Baeza et al., "Universal angle V–block work holding fixture", Issued Aug. 8, 1989, Filed May 20, 1988, Serial No. 196504, Patent Server: 4854568 Detailed View.

David Armitage, "Micromirror spatial light modulator", Issued Oct. 6, 1987, Filed Oct. 9, 1985, Serial No. 785691, Patent Server: 4698602 Detailed View.

Wijayanand Vusirikala et al., "Packaging of a monolithic microwave/optical receiver chip with an optical fiber", CtuW7, 222/CLEO '96/Tuesday Afternoon.

K.P. Jackson et al., "A High–Density,Four–Channel, OEIC Transceiver Module Utilizing Planar–Processed Optical Waveguides and Flip–Chip, Solder–Bump Technology", Journal of Lightwave Technology, vol. 12, No. 7, Jul. 1994, IEEE, pp. 1185–1191.

O. Solgaard et al. "Optoelectronic Packaging Using Silicon Surface–Micromachined Alignment Mirrors", Photonics Technology Letters, vol. 7, No. 1, Jan. 1995, IEEE, pp. 41–43.

*Primary Examiner*—William Powell
*Attorney, Agent, or Firm*—Jacobson, Price, Holman & Stern, PLLC

[57] ABSTRACT

Disclosed is a micromirror for a hybrid optoelectronic integrated circuit, a method for manufacturing the same, a micromirror-photodetector assembly and an assembly of hybrid optoelectronic integrated circuit for receiving light. The micromirror the present invention comprises a silicon substrate and at least one V-shaped groove formed in the silicon substrate and the V-shaped groove has an inclined surface reflecting light emitted from an optical waveguide to a photodetector. The alignment of the photodetector and the optical fibers is achieved without an additional attachment equipment, by inserting the optical fibers into the V-groove.

18 Claims, 7 Drawing Sheets

MICROMIRROR FOR A HYBRID OPTOELECTRONIC INTEGRATED CIRCUIT, A METHOD FOR MANUFACTURING THE SAME, A MICROMIRROR-PHOTODETECTOR ASSEMBLY AND AN ASSEMBLY OF HYBRID OPTOELECTRONIC INTEGRATED CIRCUIT FOR RECEIVING LIGHT

BACKGROUND OF THE INVENTION

1. Field of the Invention

The present invention relates to a micromirror for a hybrid optoelectronic integrated circuit, a method for manufacturing the same, a micromirror-photodetector assembly and an assembly of hybrid optoelectronic integrated circuit for receiving light; and, more particularly, to a micromirror for a hybrid optoelectronic integrated circuit capable of causing light, which is emitted from optical fibers and optical waveguides and is in parallel to a surface of a substrate, to be received by an active region of the photodetector manufactured by the planar-processed method. Also, the present invention relates to a micromirror-photodetector assembly wherein a micromirror is integrated with a photodetector and to an assembly of hybrid optoelectronic integrated circuit for receiving light, which is formed by arranging a micromirror-photodetector assembly on optical waveguides of a hybrid substrate.

2. Description of the Related Arts

Recently, various researches are made on demand for the high-speed and broadband telecommunications. Accordingly, optical transmitters and receivers essentially required in the optical communication have been developed.

In general, the integration of the optical devices can be divided into the optical electronic integrated circuit method (OEIC) and the hybrid method. One of them, the hybrid method, is widely used in the integration, because it can be easily implemented by using an established fabrication technology in its fabrication method. This hybrid method may have the benefits in its integration.

The above-mentioned hybrid optoelectronic integrated circuit is implemented by the surface mounting method on a silicon wafer board to integrate, photoelectric transducers including a semiconductor laser diode and a semiconductor photodetector and passive elements such as, an optical fiber, a waveguide, an interferometer,and a filter. At this time, the photodetector, which is used as an optical receiver for converting optical signals into electric signals, receive lights when the ray of light upon it is in the direction normal to its surface, because active regions to sense light are widely distributed on the surface of the substrate. Also, since waveguides and optical fibers, which are key elements in the hybrid optoelectronic integrated circuit, emit light from the cross-section of the waveguide, beam emitted from it propagates in parallel to the substrate. The photodetector, a surface receiving element, can receive light in parallel with the substrate in two methods.

In the first method, the photodetector is mounted vertically on the surface of the substrate and a ray of light is incident normally upon an active region of the photodetector. In the second method, after making the light path normal to the substrate by reflecting light on an inclined mirror, the active region of the photodetector is attached on the inclined mirror with its surface turned toward the inclined mirror.

The thickness of the mirror for this usage must be in the range of several ten microns and the mirror must be easily accommodated below the photodetector. Accordingly, the mirror must be small size. Typically, the mirror is fabricated by one side of a V-groove which is formed by the anisotropic etching process in a silicon substrate and the mirror is also fabricated by one side of a waveguide having inclined surfaces in silica and polymer materials.

Figure 1:
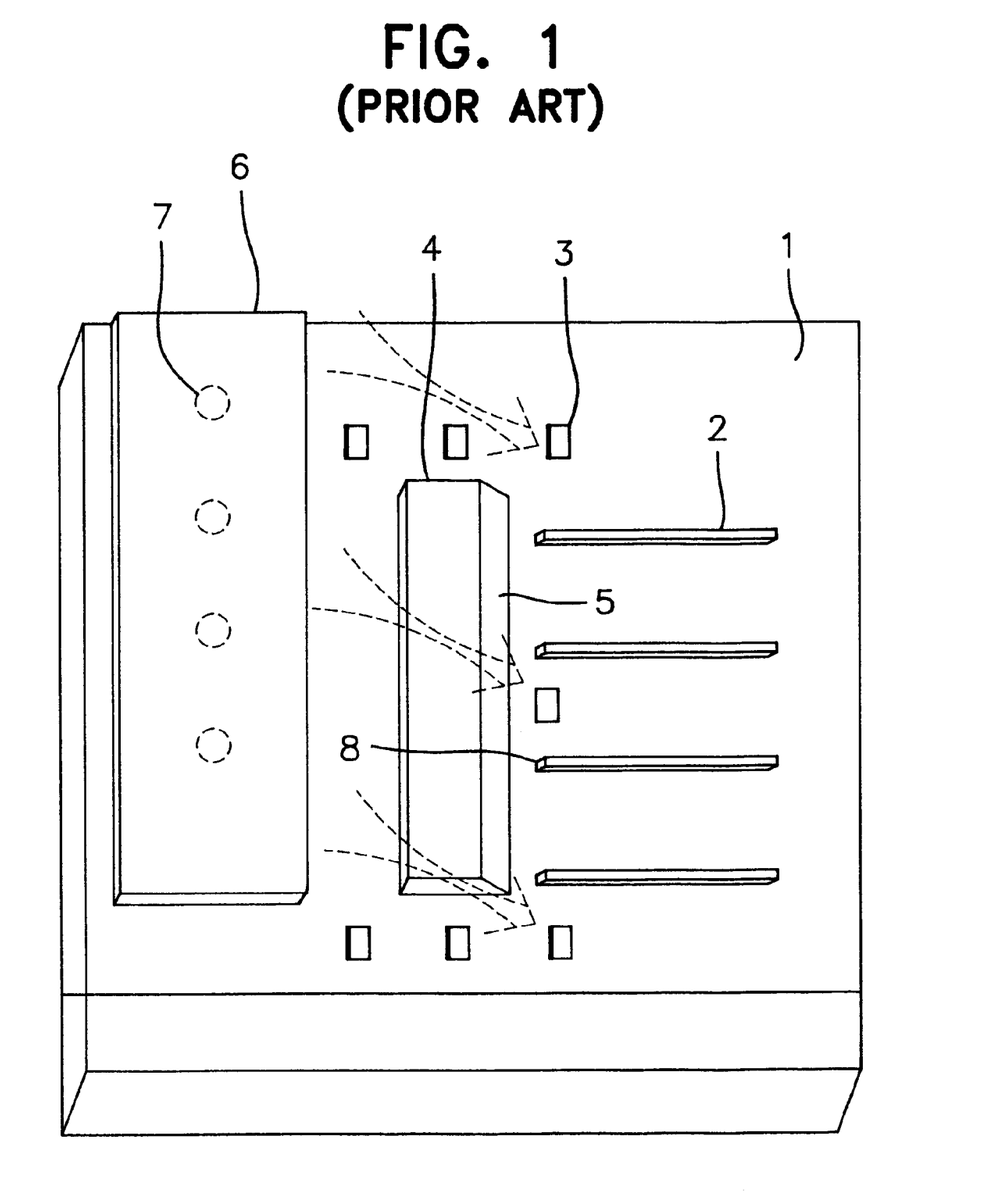
FIG. 1 is a perspective illustrating a conventional micromirror device and the usager.

Referring to FIG. 1, in which there are shown a micromirror according to the prior art, a waveguide 2 or an optical fiber are directly formed on a substrate 1, such as a silicon wafer, or they are attached to the substrate after being fabricated by individual process. A reflect surface 5 of a mirror 4 is formed just near by a core 8 of the waveguide 2 in order for it to be opposite to the core 8. Also, to arrange a photodetector 6 on the mirror 4, supports 3, which are usually fabricated by the same material as the waveguide 2, are formed on the substrate 1 and the photodetector 6 is mounted on the supports 3.

At this time, in order that the axis of beam reflecting from the reflection surface 5 of the mirror 4 corresponds to the active region 7 of the photodetector 6, the photodetector 6 is aligned with the reflection surface 5 of the mirror 4 and the optical waveguide 2.

As stated above, since the mirror 4 should be positioned below the photodetector 6 and the supports 3 has a thickness of about 40 to 60 $\mu$m, the thickness of the mirror 4 must be thin. On the other hand, because the mirror 4, which is made of a thin silicon, breaks easily, it is difficult to treat it. Also, in the case of the array consisting of a plurality of the optical waveguides 2 and the photodetector 6, as shown in FIG. 1, it is impossible for each of them to use a separate mirror. Accordingly, it is desired that only one mirror is used for a plurality of the optical waveguides 2, as shown in FIG. 1. When light emitted form the optical waveguide 2 is reflected on the surface of the mirror 4, the reflected light can be received by other photodetectors which is adjacent to the corresponding photodetector so that a crosstalk may be generated.

Figure 2A:
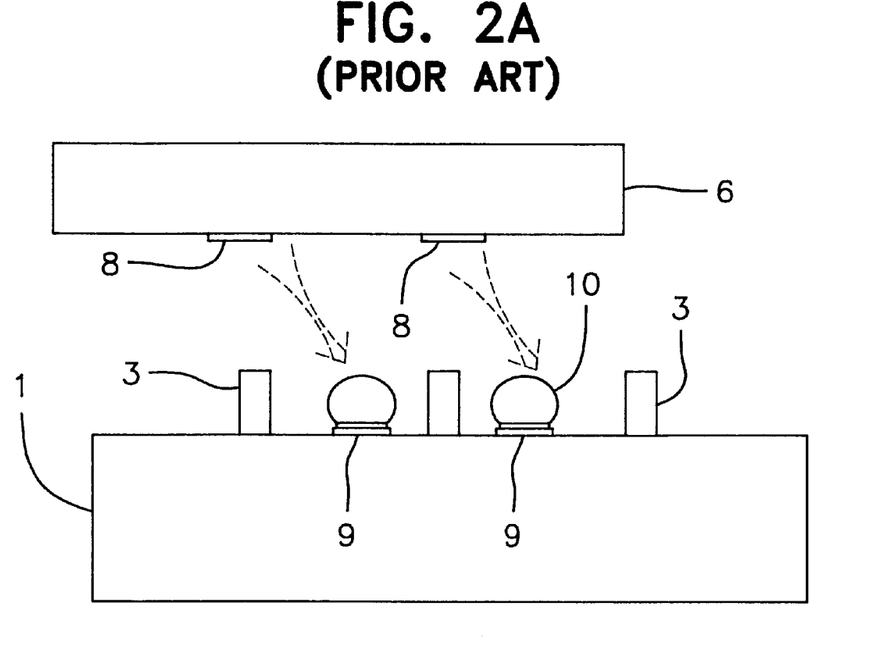
FIG. 2a and 2b are cross-sectional view illustrating a photodetector attachment to the conventional micromirror device in case of fabricating an assembly for receiving light using the conventional micromirror device.

In the conventional micromirror, to drive the photodetector 6, an electrical signal must be provided for the active region 7 of the photodetector 6. Referring to FIG. 2a, as stated above, the supports 3 are formed on the substrate 1. Solder-bumps 10 are formed between the supports 3 and the height of the solder-bumps 10 is similar to that of the supports 3. Also, metal pads 9 are formed beneath the solder-bumps 10 and some of the solder-bumps 10 are extended to connecting points, which are positioned to achieve an electrical connection to an external circuit from the substrate 1.

Figure 2B:
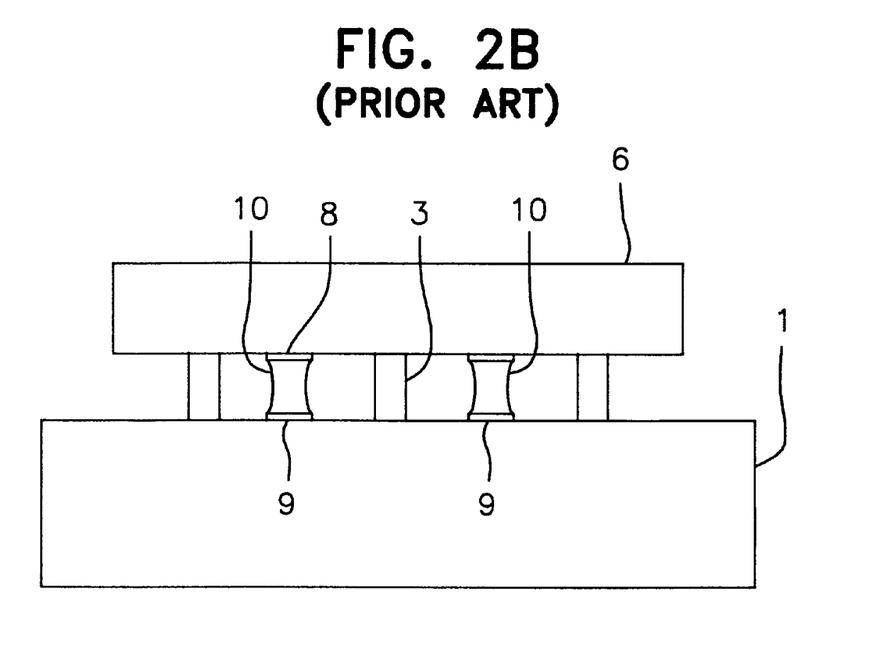

Furthermore, metal pads 8 is formed on the photodetector 6, being opposed to the solder-bumps 10. Some of the metal pads 8 is electrically connected to the active region 7 of the photodetector 6. After arranging the photodetector 6 on the supports 3, the substrate 1 is heated until the melting point of the solder-bumps 10. By doing so, as shown in FIG. 2b, the melted solder-bumps 10 bond the metal pads 8 of the photodetector 6 to the metal pads 9 of the substrate 1, to thereby achieve a mechanical attachment and an electrical connection in the photodetector 6.

However, since the height of the solder-bumps must be similar to that of the supports and it is approximately a few tens of microns, it is very difficult to employ common semiconductor processes in fabricating solder-bumps. Also, because the automatic alignment due to the surface tension of the solder-bumps doesn't act to the best of its ability, it is also very difficult to horizontally align the photodetector. Accordingly, these complete fabrication processes decrease the yield on the optoelectronic integrated circuit and also increase the unit cost of production.

SUMMARY OF THE INVENTION

Therefore, an object of the present invention is to solve the above-mentioned problems encountered in the prior art and, thus, to provide a micromirror for a hybrid optoelectronic integrated circuit capable of decreasing the number of parts and easily fabricating them, by integrating supports of a photodetector with a mirror.

Another object of the present invention is to provide a method for economically fabricating a micromirror for a hybrid optoelectronic integrated circuit.

Further another object of the present invention is to provide a micromirror-photodetector assembly capable of integrating a micromirror with a photodetector so that an electrode required in driving is extended to an external circuit.

Still another object of the present invention is to provide an assembly of hybrid optoelectronic integrated circuit for receiving light, which is attached to a micromirror-photodetector assembly, in order that optical alignment is easily formed between a photodetector and optical waveguides and between the photodetector and optical fibers at the time of coupling light between the photodetector and the optical waveguides or optical fibers.

Further still another object of the present invention is to provide an assembly of hybrid optoelectronic integrated circuit for receiving light, being capable of considerably decreasing the interference effect in which light is received by other photodetectors adjacent to the corresponding photodetector, even if a micromirror array is formed on the same substrate.

In accordance with an aspect of the present invention, there is provided a micromirror in an assembly of hybrid optoelectronic integrated circuit for receiving light, the micromirror comprising: a semiconductor substrate; and at least one V-shaped groove formed in the semiconductor substrate, having an inclined surface reflecting light emitted from an optical waveguide to a photodetector.

In accordance with another aspect of the present invention, there is provided a method for forming a micromirror in an assembly of hybrid optoelectronic integrated circuit for receiving light, the method comprising the steps of: providing a semiconductor substrate; forming a protection layer on the semiconductor substrate to prevent the semiconductor substrate from an anisotropic etchant; forming at least one V-shaped groove in the semiconductor substrate; removing a lower portion of the semiconductor substrate to expose a bottom of the V-shaped groove; and cutting the semiconductor substrate to along with the center of the V-groove, for dividing the semiconductor substrate into two parts.

In accordance with further another aspect of the present invention, there is provided a micromirror-photodetector comprising: a) a micromirror including: a semiconductor substrate; and at least one V-shaped groove formed in the semiconductor substrate, having an inclined surface reflecting light emitted from an optical waveguide; and b) a photodetector integrated with the micromirror by a flip-chip bonding method, wherein an active region of the photodetector is opposed to the inclined surface of the micromirror.

In accordance with still another aspect of the present invention, there is provided an assembly of hybrid optoelectronic integrated circuit for receiving light, the assembly comprising: a) a micromirror including: a first semiconductor substrate; and at least one V-shaped groove crack formed in the first semiconductor substrate, having an inclined surface reflecting incident light; b) a photodetector integrated with the micromirror by a flip-chip bonding method, wherein an active region of the photodetector is opposed to the inclined surface of the micromirror; and c) at least one optical waveguide formed on a second semiconductor substrate, wherein the optical waveguide is inserted into the V-shaped groove crack, whereby light emitted from the optical waveguide is reflected on the inclined surface and the active region of the photodetector receives the reflected light.

In accordance with still further another aspect of the present invention, there is provided an assembly of hybrid optoelectronic integrated circuit for receiving light, the assembly comprising: a) a micromirror-photodetector assembly including: a mirror surface array including formed in a first semiconductor substrate, wherein the mirror surface array includes a plurality of V-shaped grooves formed in the first semiconductor substrate and wherein the V-shaped grooves include an inclined surface reflecting incident light; and a photodetector array mounted on the micro mirror array, wherein an active region of the photodetector is opposed to the inclined surface of the V-shaped grooves; and b) an optical waveguide array formed on a second semiconductor substrate, wherein the optical array includes a plurality of optical waveguides and wherein the optical are inserted into cracks of the V-shaped grooves, on a first semiconductor substrate of micromirror phtodetector assembly whereby light emitted from the optical is reflected on the inclined surface and the active region of the photodetector receives the reflected light.

BRIEF DESCRIPTION OF THE DRAWINGS

Other objects and aspects of the present invention will become apparent from the following description of embodiments with reference to the accompanying drawings in which.

DETAILED DESCRIPTION OF THE PREFERRED EMBODIMENTS

Hereinafter, the present invention will be described below referring to accompanying drawings.

Figure 3A:
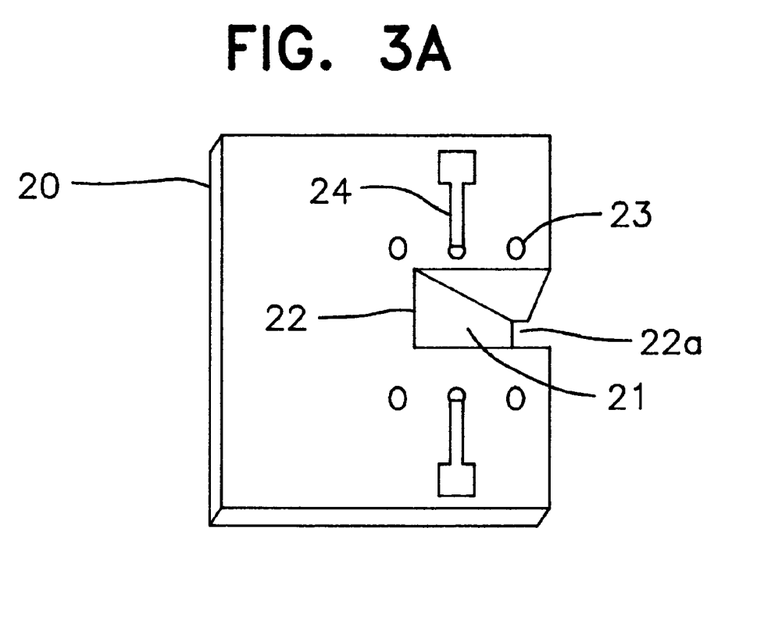
FIG. 3a is a perspective illustrating a micromirror device according to a preferred embodiment of the present invention.
Figure 3B:
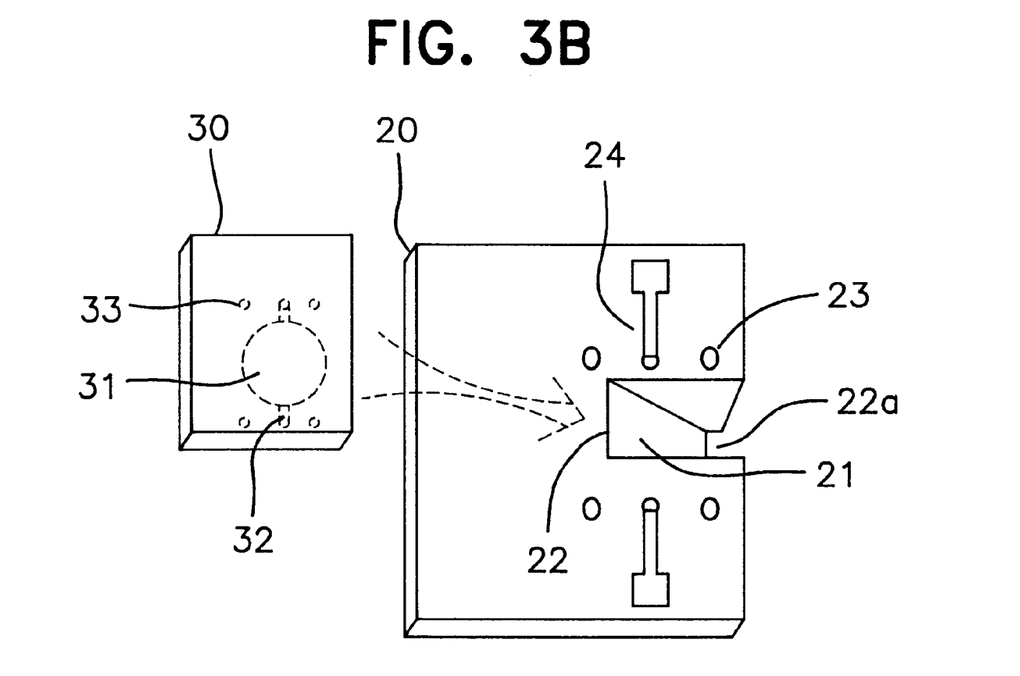
FIG. 3b is a perspective illustrating a photodetector attachment to the micromirror device, shown in FIG. 3a, of the present invention.
Figure 3C:
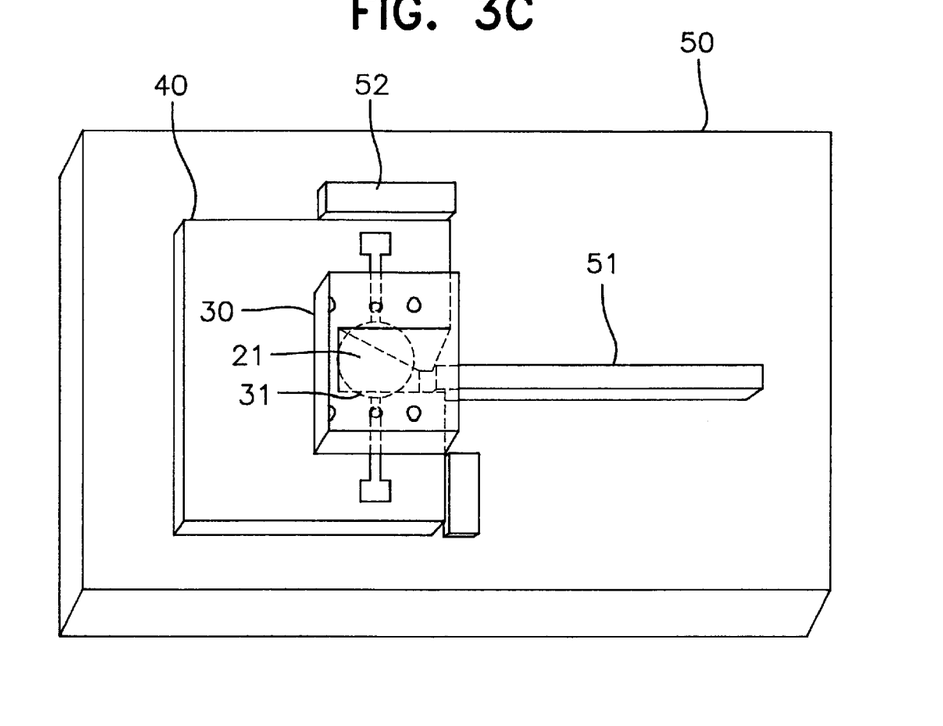
FIG. 3c is a perspective illustrating a hybrid optoelectronic integrated circuit for receiving light according to an embodiment of the present invention.
Figure 3D:
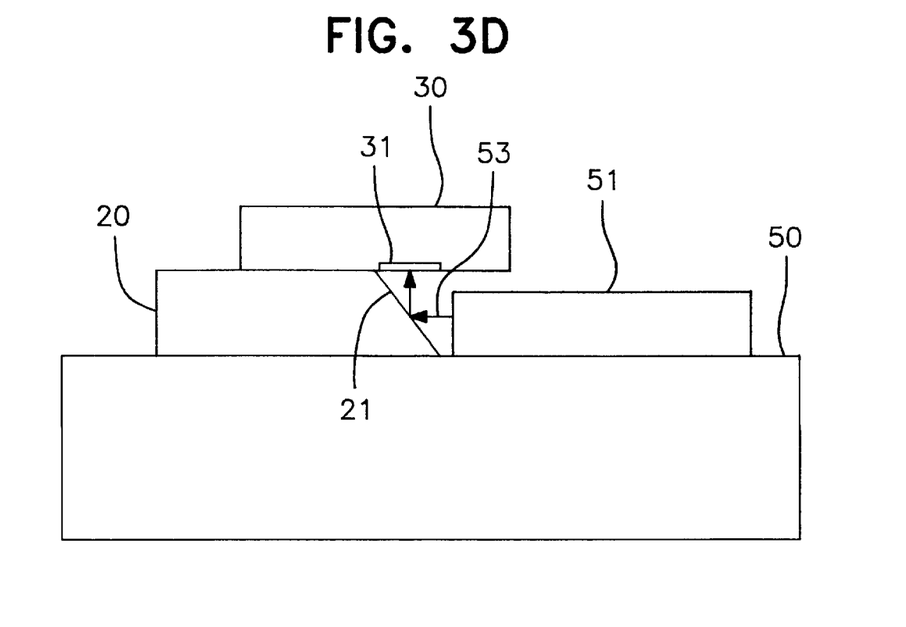
FIG. 3d is a cross-sectional view illustrating a principle of light receiving in the hybrid optoelectronic integrated circuit for receiving light of FIG. 3c.

First, FIG. 3a is a perspective illustrating a micromirror device according to a preferred embodiment of the present invention and FIG. 3b is a perspective illustrating a photodetector attachment to the micromirror device, shown in FIG. 3a, of the present invention. In addition, FIG. 3c is a perspective illustrating a hybrid optoelectronic integrated circuit for receiving light according to an embodiment of the present invention and FIG. 3d is a cross-sectional view illustrating a principle of light receiving in the hybrid optoelectronic integrated circuit for receiving light of FIG. 3c.

Referring now to FIG. 3a, a micromirror 20 according to the present invention includes a V-groove which is formed by the anisotropic etching process. The sidewall of the V-groove acts as a mirror surface 21. At this time, a plurality of solder-bumps 23 and metal pads 2 can be additional mechanic ally provided on the upper surface of the micromirror 20 to attach the photodetector to the micromirror and to apply electrical signals to a photodetector.

Referring to FIG. 3b, a micromirror 20 and a photodetecector 30 according to the present invention forms a micromirror-photodetector assembly. That is, the photodetector 30 includes an active region 31 and a plurality of metal pads 33 corresponding to a plurality of the solder-bumps 23 formed on the substrate of the micromirror 20. Also, a portion of metal pads 33 is connected to the active region 31 through the extended metal pattern 32 in the photodetector 30. The photodetector 30 is mounted on the micromirror 20 so that the active region 31 is opposed to the mirror surface 21. At this time, to mechanical and electrical connection of the photodetector, it is desired that the photodetector 30 is mounted on the micromirror 20 by the flip-chip bonding method. Also, when the photodetector 30 is mounted on the micromirror 20, it is possible to use an alignment mark, which is formed on the upper surface on the micromirror 20, to align the photodetector 30 with facility.

This micromirror-photodetector assembly mentioned above is coupled to a hybrid substrate including optical waveguides or optical fibers such that it may perform a function that the photodetector 30 receives light which is emitted in the direction horizontal to the substrate of the micromirror 20. Referring to now FIG. 3c, a micromirror-photodetector assembly 40 is positioned on an optical waveguide 51 or an optical fiber on a hybrid substrate 50 and then, to perform the effective optical coupling, the mirror surface 21 of the micromirror-photodetector assembly 40 is compatibly aligned with the optical waveguide 51, using the optical waveguide 51 and a support 52 which is simultaneously fabricated together with the optical waveguide 51. In particular, as shown in FIG. 3c, the optical waveguide 51 is aligned with the mirror surface 21 of the micromirror-photodetector assembly 40 without the use of the supports, by inserting the optical waveguide 51 into the V-groove crack 22a forming the mirror surface 21. At this time, preferably, the substrate 50 may be a 100 silicon wafer.

The mirror-photodetector assembly 40 is bonded to the hybrid substrate 50 by solder or epoxy, thereby forming the assembly of hybrid optoelectronic integrated circuit for receiving light, which includes the optical waveguide 51, the micromirror 20 and the photodetector 30.

Referring to FIG. 3d illustrating a principle of light receiving in the hybrid optoelectronic integrated circuit for receiving light, light in parallel to the surface of the substrate 50, from the optical waveguide 51 is transferred to the active region 31 in the photodetector 30. In other words, the inclined mirror surface 21 receives laser beam 53 emitted from the optical waveguide 51 in parallel to the hybrid substrate 50, the incident light is upwardly reflected according to an angle of inclination of the inclined mirror surface 21, and then the active region 31 of the photodetector 30 receives the reflected light form the mirror surface 21. As a result, the inclined mirror surface 21 acts as a mirror converting a horizontal light path into a vertical light path with respect to the active region 31.

Figure 4:
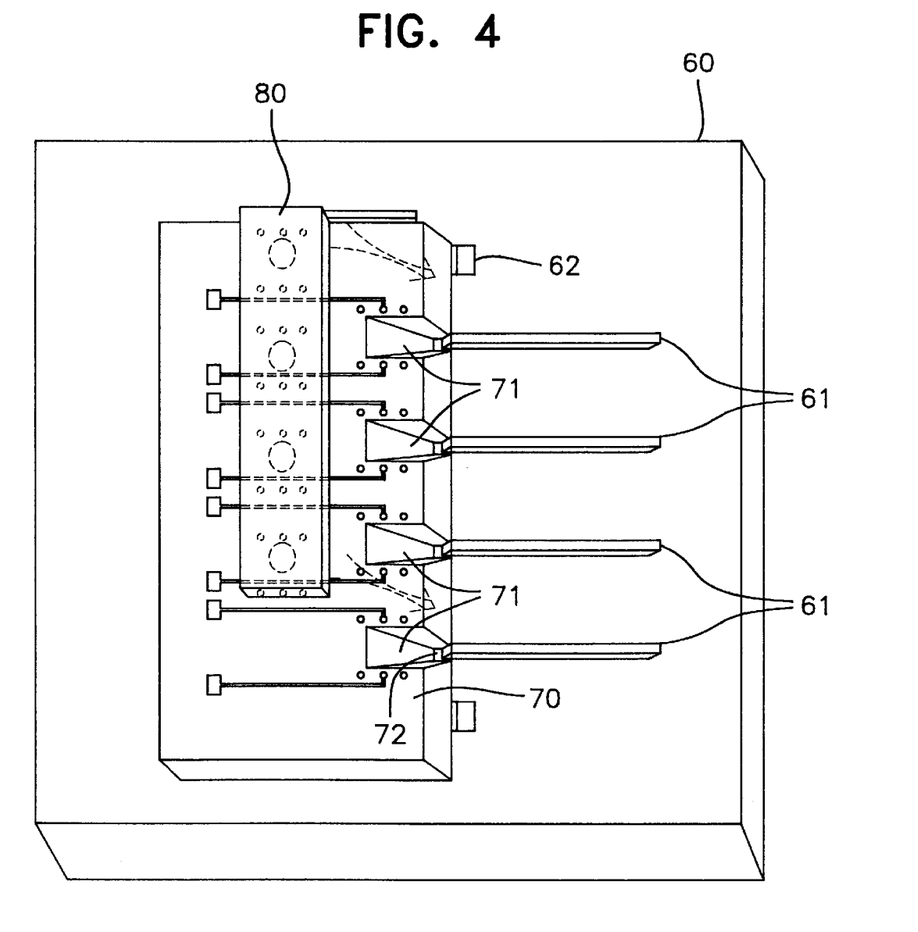
FIG. 4 is a perspective illustrating a hybrid optoelectronic integrated circuit for receiving light, which includes a micromirror array, according to another embodiment of the present invention.

Referring to FIG. 4, in which there is shown a hybrid optoelectronic integrated circuit including a micromirror array, according to another embodiment of the present invention, a micromirror array 71, in which a plurality of mirror surfaces are formed, is formed in one micromirror body 70 in order to transfer light emitted from an optical waveguide array 61 to a planar light-receiving photodetector array 80 including a plurality of photodetectors, there by improving its effectiveness.

At this time, although it is possible to form supports 62 on a hybrid substrate 60, in order to effectively align the mirror surface array 71 with the optical waveguide array 61, it is desired that optical waveguide are inserted into V-grooves 72, respectively. The metal pads for an electrical connection and the solder-bumps for a mechanical attachment and an electrical connection are also used in the micromirror having a single mirror surface. Further, a plurality of photodetectors, which are individually separated, instead of the photodetector array 80 as shown in FIG. 4, can be used. In similar, in the case where optical fibers are used instead of the optical waveguide array 61, the micromirror body 70 including the mirror surface array 71 may be employed.

FIGS. 5a through 5e are cross-sectional views and perspectives illustrating a method for fabricating a micromirror device according to a preferred embodiment of the present invention.

Figure 5A:
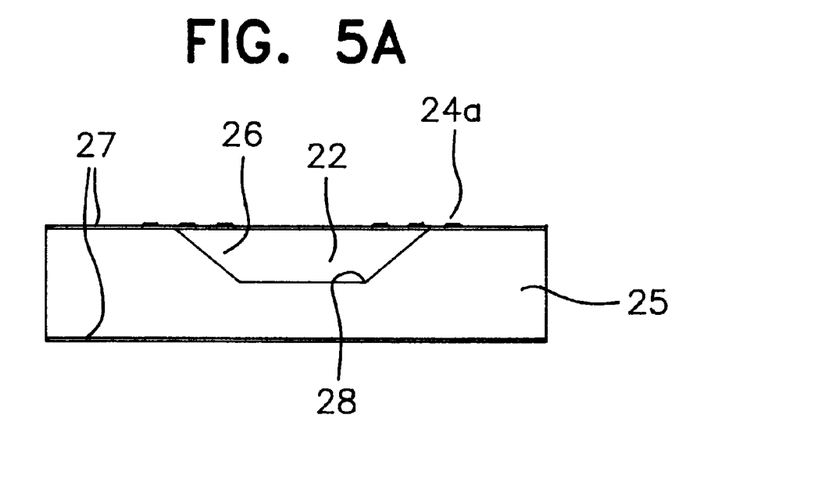
FIGS. 5a through 5e are cross-sectional views and perspectives illustrating a method for fabricating a micromirror device according to a preferred embodiment of the present invention.

First, referring now to FIG. 5a, a protection layer 27 from an anisotropic etchant is formed on the upper and lower surfaces of a silicon wafer 25 having the crystalline orientation of (100) or (110), preferably (100), and a predetermined V-groove 22 is formed in the silicon wafer 25, by using the conventional semiconductor processing method. For example, the predetermined V-groove 22 may be formed by an anisotropic etchant, such as KOH and EDP water solution. A plurality of metal patterns 24a and solder-bumps 24b can be formed on the silicon wafer 25, for simultaneously carrying out the mechanical attachment and electrical connection. Also, to increase an amount of reflected light from the sidewall 26 of the V-groove 22, it is possible to form a metal thin film on the sidewall 26. Furthermore, the metal patterns 24a can be formed before the V-groove 22 formation.

Figure 5B:
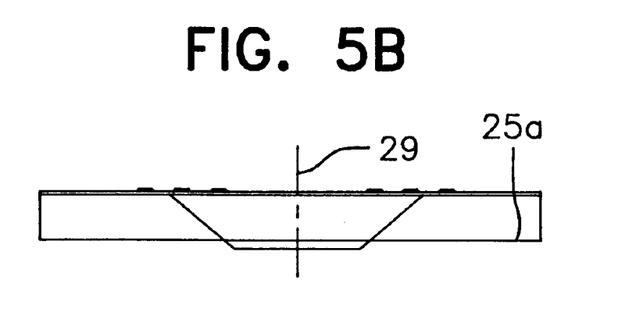
Figure 5C:
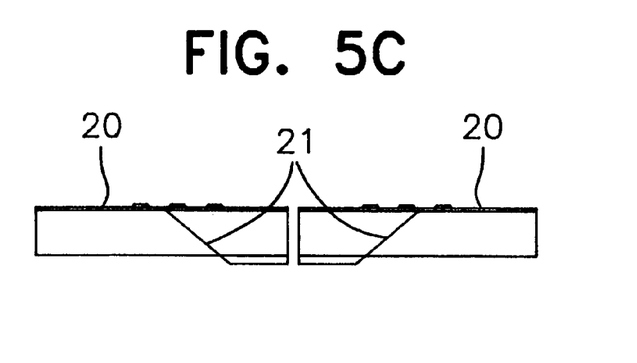
Figure 5D:
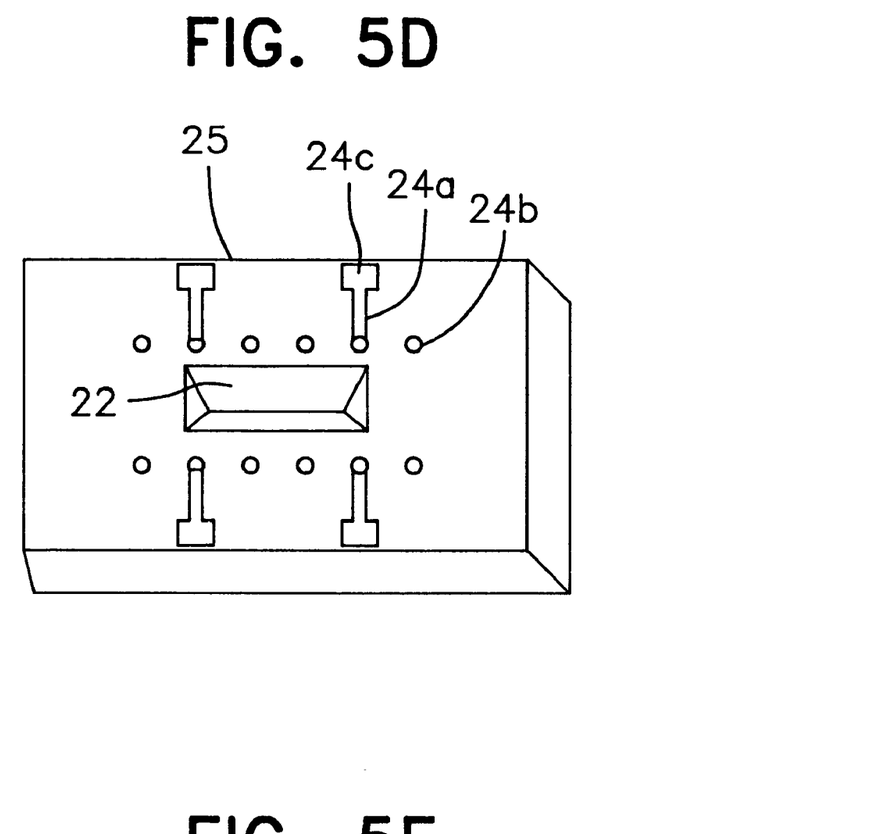

Referring now to FIG. 5d, in which there is shown a perspective illustrating a substrate including the V-groove 22, solder-bumps 24b and metal patterns 24a, a portion of the metal pattern 24a is connected to the solder-bumps 24b and the other portion of the metal pattern 24a is connected to a wire bond pad 24c, thereby electrically coupling the photodetector to an external circuit.

Next, referring to FIG. 5b, a bottom 25a of the silicon wafer 25 is ground and polished so that the portion of the V-groove 22 is exposed. When the silicon wafer 25 is attached to other hybrid substrates, this grinding of the bottom 25a of the silicon wafer 25 is carried out to make the sidewall 26 of the V-groove 22 in close vicinity to the hybrid substrate.

Referring to FIG. 5c, after polishing the bottom 25a of the silicon wafer 25, the silicon wafer 25 is cut by using a diamond saw along with the broken line 29 in the middle of the V-groove 22, thereby dividing the silicon wafer 25 into two parts. At this time, each of the two separated parts is used for the micromirror 20.

Figure 5E:
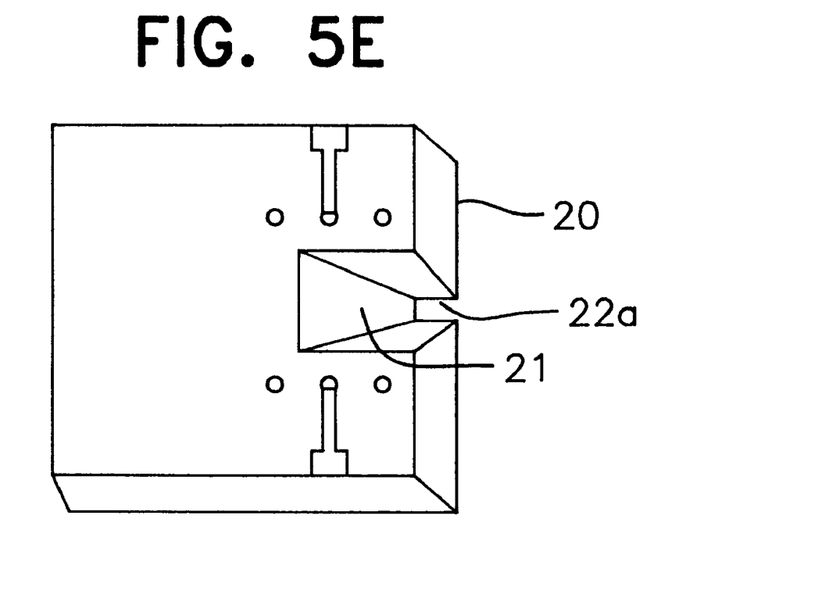

Finally, referring to FIG. 5e, in which there is shown a perspective illustrating the micromirror 20 according to the present invention, the micromirror 20 has the V-groove crack 22a and the mirror surface 21.

As apparent from the above description, the assembly of the photodetector and the micromirror, according to the present invention, is easily fabricated, by integrating the micromirror with the substrate to which the photodetector is attached. The assembly according to the present invention may easily form the electrode required in driving the photodetector and considerably decrease the interference effect for the photodetector and micromirror arrys in which light is received by other photodetectors adjacent to the corresponding photodetector. The alignment of the photodetector and the optical fibers is achieved without an additional attachment equipment, by inserting the optical fibers into the V-groove crack. Accordingly, the present invention provides an effective and economical light receiving apparatus which is essentially required in the optical communications.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A micromirror in an assembly of hybrid optoelectronic integrated circuit for receiving light, the micromirror comprising:
   a semiconductor substrate; and
   at least one V-shaped groove formed in the semiconductor substrate, having an inclined surface reflecting light emitted from an optical waveguide to a photodetector.

2. The micromirror in accordance with claim 1, wherein the micromirror further comprises solder-bumps and metal pads formed on the semiconductor substrate.

3. The micromirror in accordance with claim 1, wherein the micromirror further comprises a metal thin film formed on the an inclined surface of the V-shaped groove.

4. The micromirror in accordance with claim 1, wherein the semiconductor substrate is a silicon having a crystalline orientation of (100).

5. A method for forming a micromirror in an assembly of hybrid optoelectronic integrated circuit for receiving light, the method comprising the steps of:
   providing a semiconductor substrate;
   forming a protection layer on the semiconductor substrate to prevent the semiconductor substrate from an anisotropic etchant;
   forming at least one V-shaped groove in the semiconductor substrate;
   removing a lower portion of the semiconductor substrate to expose a bottom of the V-shaped groove; and
   cutting the semiconductor substrate to along with the center of the V-groove, for dividing the semiconductor substrate into two parts.

6. The method in accordance with claim 5, wherein the step of removing a lower portion of the semiconductor substrate to expose a bottom of the V-shaped groove further comprises the step of polishing a bottom of the removed semiconductor substrate.

7. The method in accordance with claim 5, wherein the method further comprises the step of forming a plurality of metal patterns and solder-bumps.

8. A micromirror-photodetector assembly comprising:
   a) a micromirror including:
      a semiconductor substrate; and
      at least one V-shaped groove formed in the semiconductor substrate, having an inclined surface reflecting light emitted from an optical waveguide; and
   b) a photodetector integrated with the micromirror by a flip-chip bonding method, wherein an active region of the photodetector is opposed to the inclined surface of the micromirror.

9. The micromirror-photodetector in accordance with claim 8, wherein the micromirror-photodetector further comprises at least one alignment mark to align the photodetector with the micromirror.

10. The micromirror-photodetector in accordance with claim 8, wherein the micromirror-photodetector further comprises solder-bumps and metal pads formed on the semiconductor substrate.

11. The micromirror in accordance with claim 8, wherein the micromirror-photodetector further comprises a metal thin film formed on the an inclined surface of the V-shaped groove.

12. An assembly of hybrid optoelectronic integrated circuit for receiving light, the assembly comprising:
   a) a micromirror including:
      a first semiconductor substrate; and
      at least one V-shaped groove crack formed in the first semiconductor substrate, having an inclined surface reflecting incident light;
   b) a photodetector integrated with the micromirror by a flip-chip bonding method, wherein an active region of the photodetector is opposed to the inclined surface of the micromirror; and
   c) at least one optical waveguide formed on a second semiconductor substrate, wherein the optical waveguide is inserted into the V-shaped groove crack,
   whereby light emitted from the optical waveguide is reflected on the inclined surface and the active region of the photodetector receives the reflected light.

13. The assembly in accordance with claim 12, wherein the assembly further comprises supports formed on the first semiconductor substrate to align the active region of the photodetector with the inclined surface in the micromirror.

14. The assembly in accordance with claim 12, wherein the first semiconductor substrate is a silicon having a crystalline orientation of (100).

15. The assembly in accordance with claim 12, wherein the micromirror further comprises at least one alignment mark to align the photodetector with the micromirror.

16. The assembly in accordance with claim 12, wherein the micromirror further comprises a metal thin film formed on the an inclined surface of the V-shaped groove.

17. An assembly of hybrid optoelectronic integrated circuit for receiving light, the assembly comprising:
   a) a micromirror-photodetector including:
      a mirror surface array including formed in a first semiconductor substrate, wherein the mirror surface array includes a plurality of V-shaped grooves formed in the first semiconductor substrate and wherein the V-shaped grooves include an inclined surface reflecting incident light; and a photodetector array mounted on the micromirror array, wherein an active region of the photodetector is opposed to the inclined surface of the V-shaped grooves; and b) an optical waveguide array formed on a second semiconductor substrate, wherein the optical waveguide array includes a plurality of optical waveguides and wherein the optical waveguides are inserted into cracks of the V-shaped grooves, whereby light emitted from the optical waveguides is reflected on the inclined surface and the active region of the photodetector receives the reflected light.

18. The assembly in accordance with claim 17, wherein the photodetector is a planar light receiving photodetector array.

* * * * *